Patented Apr. 6, 1948

2,439,081

UNITED STATES PATENT OFFICE 2,439,081

POLYMERS OF CYANOACRYLIC ACID DERIVATIVES

Joseph B. Dickey and Fred C. Duennebier, Rochester, N. Y., assignors to Eastman Kodak Company, Rochester, N. Y., a corporation of New Jersey No Drawing. Application May 5, 1944, Serial No. 534,337

1 Claim. (Cl. 260—80)

This invention relates to new polymeric materials characterized by the use of the ester or amides of cyanoacrylic acids and their formation.

One object of our invention is the preparation of new polymers. Other objects of our invention will appear herein.

Our invention in its broadest aspects comprises the preparation of polymers by subjecting an ester or an amide of cyanoacrylic acid to a polymerization procedure either alone or mixed with other polymerizable monomers. The resin formation may result in a simple polymer, for instance, by using all of one type of compound, or it may result in the copolymerization of two or more compounds of the class constituted by the amides and esters of the cyanoacrylic acids. If desired, one or more of the members of this class may be copolymerized with other polymerizable monomers, so as to form copolymers therewith.

Any of the amides or esters of the cyanoacrylic acids may be employed in preparing the novel polymers of our invention. For instance, the esters may be alkyl, aryl, or heterocyclic esters. The amides which may be used may have as the substituents on the amide nitrogen either alkyl, aryl, or heterocyclic groups. It is preferable that the amide nitrogen have at least one hydrocarbon substituent thereon, the other substituent of which may be hydrogen or hydrocarbon. The cyanoacrylic acids the amides or esters of which are suitable may be simply cyanoacrylic acid itself in which all of the substituents on the vinyl carbons are hydrogen, or they may be cyanoacrylic acids in which the substituents on the vinyl carbons may be other than hydrogen. For instance, either one or both of the replaceable hydrogens of the cyanoacrylic acid may be replaced by fluorine, chlorine, alkyl, aryl, heterocyclic, cyano, carboxy, alkoxy, or any other substituent which does not interefere with the operation of the polymerization. For ordinary purposes, the simple cyanoacrylic acid amides or esters are quite satisfactory, the presence of further groups therein being primarily for the purpose of imparting different characteristics or emphasizing those which are already present.

The resins prepared in accordance with our invention may result from either (1) the simple polymerization of one compound of the class described herein; (2) the copolymerization of two compounds selected from that class; or (3) the copolymerization of one or more compounds selected from that class with another polymerizable monomer. Some of the monomers which are especially useful for copolymerizing with the cyanoacrylic acid amides or esters are unsaturated compounds, such as vinyl acetate, iso-propenyl acetate, methyl vinyl ketone, methyl iso-propenyl ketone, methyl iso-propenyl ether, styrene, methyl acrylate, methyl methacrylate, acrylic acid-N-ethylamide, vinyl-N-propyl sulfonamide, iso-propyl maleate, vinyl chloride and the like. Other polymerizable monomers which may be employed are methyl iso-propyl fumarate, vinylidine dichloride, iso-butylene, ethylene, butadiene, acrylonitrile, 2-cyanobutadiene-1,3, 2-chlorobutadiene-1,3, acetoxy butadiene and the like.

The polymerization or copolymerization of compounds in accordance with our invention may be carried out using any of the various procedures of the prior art. For instance, the polymerization may be carried out in the mass, such as by heating in a sealed tube. It may be carried out by forming an emulsion in the compounds to be polymerized or copolymerized with a suitable wetting agent and polymerizing by heating with a catalyst therein or by some other recognized means of promoting polymerization. If desired, the polymerization or copolymerization may be carried out by the "bead" method or by conducting the polymerization while the monomer is in solution in an organic solvent. In some cases, particularly desirable products can be obtained by carrying out the polymerization under pressure in excess of 750 atmospheres. The use of these various methods of polymerization both in the making of the simple polymer and in copolymerizing will be illustrated by the specific examples which will be given herein.

If desired, there may be added to the polymerization mass 0.1–10% by weight of certain bifunctional monomers, such as dimethallyl adipate or sebacate and thereby cross-linking is obtained and insoluble polymers result.

Polymerization using the monomers in accordance with our invention may be employed by any of the means heretofore employed to impel a polymerization process. For instance, some of the agents which may be used to promote polymerization are heat, light, oxygen catalyst, boron trifluoride, tin tetrachloride or the like. Some of the oxygen catalysts which are useful for polymerization are benzoyl peroxide, hydrogen peroxide, acetyl peroxide, oxygen, ozone, urea peroxide, and tetralin peroxide. Compounds selected from the amides or esters of the cyanoacrylic acids may be copolymerized with each other or with other polymerizable monomers using any physically practical molecular ratio. It is desirable that the cyanoacrylic acid amide or ester or both constitute at least 20 mole % of the monomer material which will enter into the polymerization reaction. The following examples illustrate the preparation of polymers in accordance with our invention.

Example 1

140 grams of iso-propyl-$\beta$-cyano acrylate were mixed with 400 cc. of water, 1 gram of gum arabic, and 2 cc. of 10% hydrogen peroxide solution in a container of about 600-cc. capacity. The container was closed and the mass was tumbled at 40° C. The temperature was slowly raised to 60° C. as the polymerization progressed, and the system was maintained at this temperature until the polymerization was complete. The beads of polymer which were formed were removed, washed with water, and dried. If purification is desired, the polymer could be dissolved in pyridine and poured into water with stirring. Instead of the iso-propyl ester of $\beta$-cyanoacrylic acid, some other ester may be employed in this process, such as the methyl, ethyl, $\beta$-diethylaminoethyl, phenyl, $\beta$-methoxyethyl, benzyl, cyclohexyl, tetrahydro-furfuryl, or $\beta$-hydroxyethyl ester of $\beta$-cyanoacrylic acid.

Example 2

11 grams of methyl-$\beta$-cyano acrylate were mixed with 20 grams of di-iso-propyl fumarate and 0.05 grams of benzoyl peroxide, and polymerization was conducted by subjecting the mixture in a sealed tube to a temperature of 40° C. until it was viscous. The temperature was then slowly raised to 60° C. until the polymerization was complete. A slightly yellowish resin was obtained which was susceptible to separation and purification as in Example 1.

Example 3

18.7 grams of the phenyl ester of $\beta$-cyano-$\alpha$-methyl acrylate were mixed with 8.7 grams of vinyl acetate and 62.5 grams of vinyl chloride and the polymerization was conducted as described in the preceding example. A resin was obtained which could be drawn into fibers characterized by their high tensile strength.

Example 4

10 grams of methyl $\beta$-cyano acrylate were mixed with 20 grams of methyl methacrylate and 0.05 gram of benzoyl peroxide and the mass was polymerized in accordance with the method of Example 2. The resin obtained was purified by dissolving in pyridine and precipitating in water. The resulting resin was found to be soluble in acetone or dioxane.

Example 5

10 grams of methyl $\beta$-cyano acrylate and 54 grams of butadiene were dispersed in 500 cc. of water, using gum arabic as a dispersing agent. The resin which forms by polymerizing was coagulated by adding acid and the water was separated therefrom. A rubbery material was obtained which was susceptible to vulcanization. In this example, the ratio between the cyano acrylate and butadiene may be varied as desired. Instead of butadiene, substituted butadienes may be employed in a similar manner.

Example 6

10 grams of methyl $\beta$-cyano acrylate were mixed with 20 grams of iso-propenyl acetate and 40 grams of di-iso-propyl fumarate and the mass was polymerized as described in Example 2. The resulting beads were separated out and were found to be suitable for molding purposes.

Example 7

11 grams of ethyl $\beta$-cyano acrylate were mixed with 21 grams of styrene and this mixture was formed into an emulsion and polymerized. The resin obtained was found to have rubbery characteristics.

Example 8

10 grams of the methyl ester of $\beta$-cyano $\beta$-methoxyethyl acrylic acid were charged into an autoclave and ethylene under a pressure of 2600 atmospheres containing 0.07% of oxygen was pumped into a 250-cc. high pressure autoclave. The mixture was heated for 20-24 hours to a temperature of 210° C. with shaking. When cooled, the product was removed and could be drawn into threads. It is also useful for films, lacquers, molding and the like. In place of ethylene, other alkylenes, such as propylene, butylene, iso-butylene or the like may be employed. If desired, other monomers may also be incorporated in the mixture. For example, styrene, methyl maleate, vinyl chloride, or vinyl methyl ether could be employed.

Example 9

152 grams of $\beta$-cyano-N, N-diethyl acrylamide were mixed with 400 cc. of water, 1 gram of gum arabic and 2 cc. of 10% hydrogen peroxide in a 600-cc. size container which was tumbled at 40° C. The temperature was slowly raised to 60° C. over the course of the reaction and maintained at that temperature until the polymerization was complete. The beads of polymer were removed, washed with water, and dried.

Example 10

11 grams of $\beta$-cyano-N-ethylacrylamide were mixed with 20 grams of di-iso-propyl fumaryl and 0.05 grams of benzoyl peroxide. The mixture was placed in a glass tube which was supplied with nitrogen and then sealed. The mass was then polymerized by heating the tube at 40° C. until the mixture became viscous. The mixture was then slowly raised to 60° C. until complete polymerization was obtained.

Example 11

15 grams of $\beta$-cyano-N-$\beta$-methoxy-ethylacrylamide were mixed with 8.7 grams of vinyl acetate and 62.5 grams of vinyl chloride. The mixture was sealed in a glass tube supplied with nitrogen as described in the preceding example. A resin was obtained characterized by its toughness when drawn into fibers.

Example 12

13 grams of $\beta$-cyanoacryl-N-propylamide were mixed with 20 grams of methyl methacrylate and 0.05 gram of benzoyl peroxide and sealed in a glass tube supplied only with inert gas. Polymerization was accomplished by heating to an elevated temperature until a viscous mass was obtained.

Example 13

16 grams of $\beta$-cyano-N-phenyl acrylamide were mixed with 54 grams of butadiene and dispersed in 500 cc. of water, using gum arabic as a dispersing agent. The mass was polymerized by agitating at an elevated temperature. An emulsion of synthetic resin was obtained which was coagulated by adding acid and separating the liquid therefrom.

*Example 14*

24 grams of β-cyano-N-lauryl acrylamide were mixed with 20 grams of iso-propenyl acetate and 40 grams of di-iso-propyl fumarate and the whole was polymerized by heating in a sealed tube supplied with inert gas. Beads of a synthetic resin were obtained which were separable in the usual manner of separating the products of mass polymerization products.

*Example 15*

18 grams of β-cyano-N, N-di-β-hydroxyethylamide-α-methyl acrylamide were mixed with 21 grams of styrene and an emulsion was formed therefrom. Polymerization was effected and a synthetic resin was obtained.

In the above examples, the β-cyanoacrylic acid compounds which have been found to be most suitable are the trans form of this compound. The manufacture of β-cyanoacrylic acid esters is described in the prior art. For instance, U. S. Patent No. 2,293,969 describes a method of making esters of these acids, which esters would be useful as the starting material for polymerization processes in accordance with our invention. The amides of these acids may be prepared in the customary manner employed for preparing amides of organic acids. For instance, the acid chloride of the β-cyanoacrylic acid may be reacted with ammonia or a primary or secondary amine to obtain the desired amide.

Where the β-cyanoacrylic acid amides or esters are copolymerized with other polymerizable monomers, it is desirable that the mixture of monomers to be polymerized contain at least 10% of the β-cyanoacrylic acid compound, in order to impart properties thereto characteristic of polymers made from cyanoacrylic acid esters or amides.

We claim:

A polymer prepared by polymerizing a β-cyanoacrylic acid amide, trans form.

JOSEPH B. DICKEY.
FRED C. DUENNEBIER.

REFERENCES CITED

The following references are of record in the file of this patent:

UNITED STATES PATENTS

| Number | Name | Date |
|---|---|---|
| 2,160,375 | Voss et al. | May 30, 1939 |
| 2,168,534 | Nuesslein et al. | Aug. 8, 1939 |
| 2,168,535 | Nuesslein et al. | Aug. 8, 1939 |
| 2,224,022 | Kurtz | Dec. 3, 1940 |
| 2,293,969 | Crawford et al. | Aug. 25, 1942 |

FOREIGN PATENTS

| Number | Country | Date |
|---|---|---|
| 814,093 | France | Mar. 8, 1937 |

OTHER REFERENCES

Starkweather, "Polymerization Under High Pressure," J. Am. Chem. Soc. 56, 1870–4 (Sept. 1934).